July 15, 1969 W. C. WEHNER 3,455,618

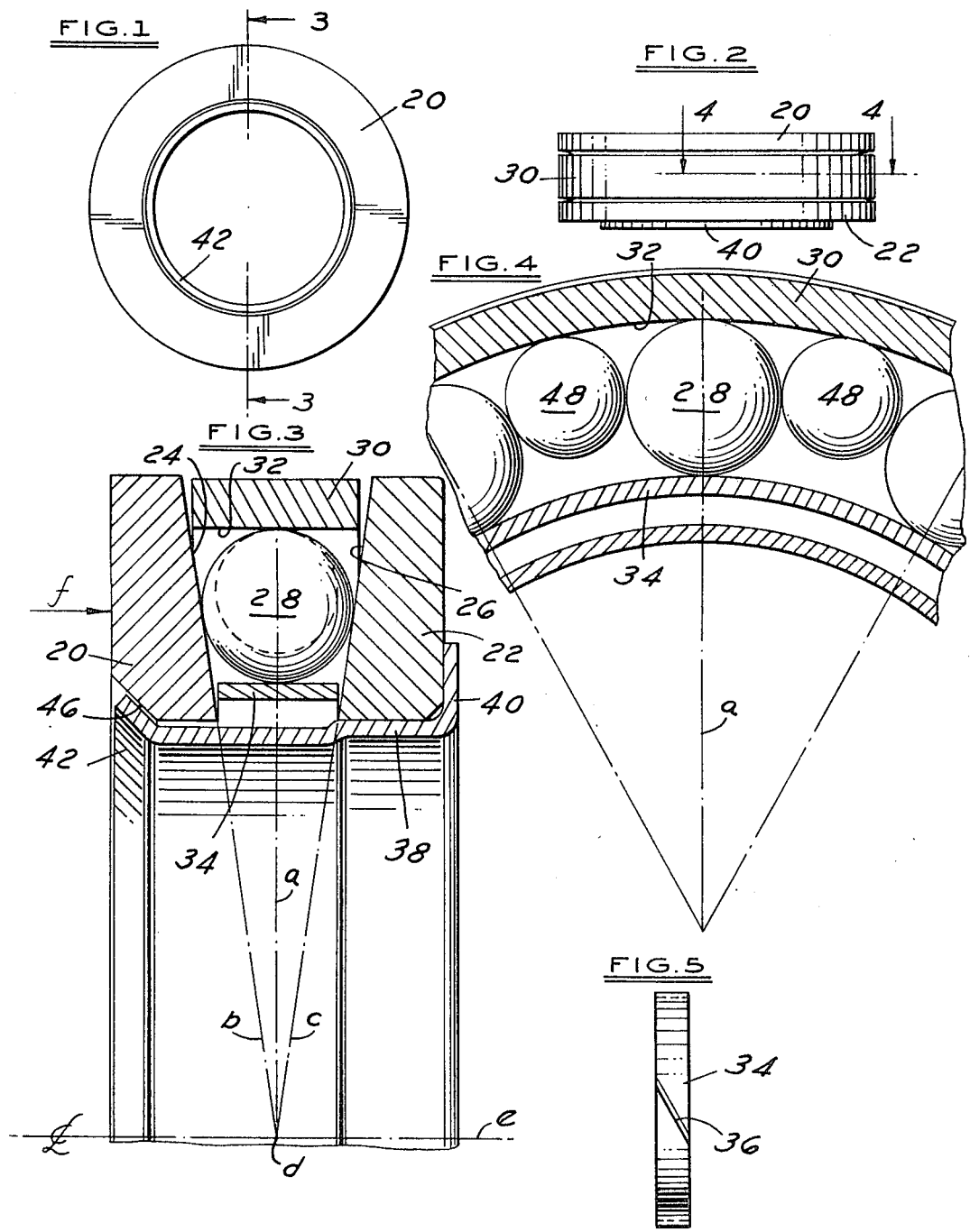

THRUST BEARING

Filed Jan. 10, 1968 3 Sheets-Sheet 2

INVENTOR
WILLIAM C. WEHNER
BY
Burton & Parker
ATTORNEYS

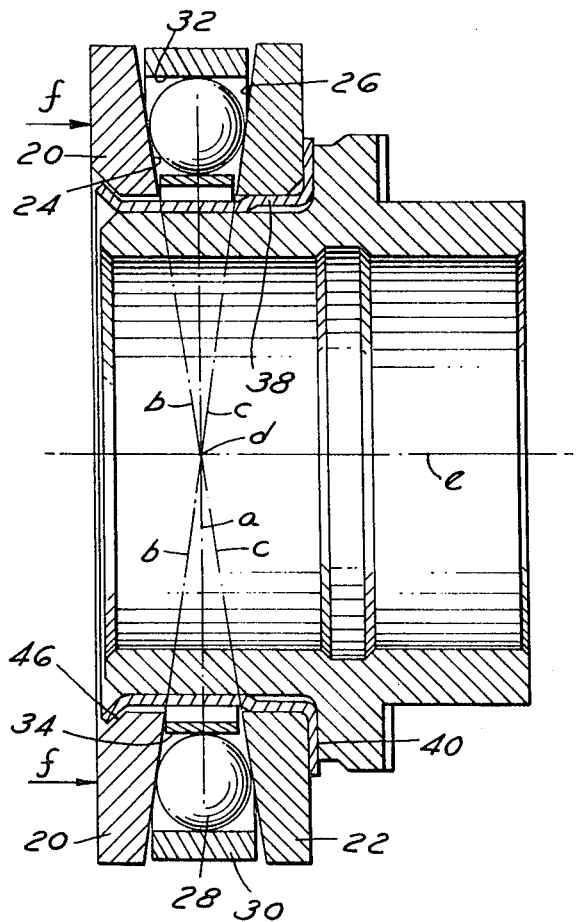

United States Patent Office 3,455,618
Patented July 15, 1969

3,455,618
THRUST BEARING
William C. Wehner, Detroit, Mich., assignor to Moog Industries, Inc., St. Louis, Mo., a corporation of Missouri
Filed Jan. 10, 1968, Ser. No. 696,811
Int. Cl. F16c 19/00, 19/04
U.S. Cl. 308—233                        12 Claims

ABSTRACT OF THE DISCLOSURE

This disclosure relates to a thrust bearing having a pair of opposed bearing members defining opposed annular bearing faces, a plurality of unrestrained ball bearings disposed between the bearing faces, a control ring encircling the balls having a bearing face perpendicular to the rolling axis of the ball bearings, and a split retainer ring bearing against the inner surface of the ball bearings establishing a three point contact between the ball bearings and the bearing faces. The projection of the annular bearing faces of the bearing members converge in a point in the common axis of the annular bearing faces and the rolling axis of the ball bearings to prevent abrasive sliding of the ball bearings during rotation of one of the bearing members. In one of the disclosed embodiments of the thrust bearing, the bearing members define opposed truncated conical bearing faces, and in the other embodiment one of the faces is planar and the other defines a truncated conical face.

Field of the invention

This invention relates to thrust bearings, such as the thrust bearing of a vehicle clutch throw-out bearing.

DESCRIPTION OF THE PRIOR ART

The commercial form of an automotive clutch throw-out bearing includes a pair of opposed planer bearing members having grooves in which the ball bearings roll, and a ball race which maintains a predetermined spacing of the balls. In this environment the balls slide or skid between the bearing faces, causing uneven frictional wear of the ball bearings and the bearing faces, which compounds the problem and eventually destroys the bearing. The primary object of the thrust bearing of my invention is to provide a bearing in which the ball bearings are free to "roll," as they were intended, thereby preventing abrasive sliding contact between the ball bearings and the bearing faces.

The prior art also includes a number of "anti-friction" thrust bearings, however the roller or ball bearings shown by the prior art are generally restrained by grooves in one or both of the bearing members, and/or the balls are restrained by a ball race. In these bearings, the balls are still subject to sliding contact with the bearing faces, resulting in frictional wear. Examples of "anti-friction" thrust bearings include the following United States Patents: 739,717, 780,409, 1,122,596, 1,334,266.

Summary of the invention

The thrust bearing of my invention has a pair of bearing members defining opposed annular bearing faces, a plurality of roller members disposed between the bearing faces in roller bearing engagement therewith, a control ring which encircles the roller members having a bearing face substantially perpendicular to the rolling axis of the roller members, and a retainer means which urges the roller members toward the control ring, thereby establishing a three point contact between the roller members and the bearing faces. The projection of the opposed annular bearing faces of the bearing members converges to a point in the common axis of the annular bearing faces, in the rolling axis of the roller members, to prevent abrasive sliding contact of the roller members with the bearing faces.

In the preferred embodiment of the thrust bearing of my invention, the opposed annular bearing faces of the bearing members each define a truncated annular surface whose projections converge at the above referenced point, and the bearing face of the control ring is parallel to the common axis of the annular bearing faces. The retainer means is a split ring which bears against the inner surface of the roller members to establish the aforesaid three point bearing contact between the roller members and the bearing faces. The roller members are ball bearings which are disposed between the annular bearing faces without a restraining means, such as a ball race, or grooves in the bearing faces. In the other embodiment of my invention, one of the annular bearing faces of the bearing members defines a truncated conical annular surface, and the other bearing face is planar. In this embodiment, the bearing face of the control ring is defined at an acute angle to the planar surface of the bearing member, perpendicular to the rolling axis of the rolling members, or ball bearings. The thrust bearing may include a number of smaller balls, spaced between the aforesaid ball bearings, to maintain the spacing between the ball bearings.

Brief description of the drawings

FIGURE 1 is a top view of one embodiment of the thrust bearing of my invention;

FIGURE 2 is a side view of the thrust bearing shown in FIGURE 1;

FIGURE 3 is a side cross sectional view of the thrust bearing shown in FIGURE 1, in the direction of view arrows 3—3;

FIGURE 4 is a partial top cross sectional view of the thrust bearing shown in FIGURE 2, in the direction of view arrows 4—4;

FIGURE 5 is a side view of the retaining ring shown in FIGURES 3 and 4;

FIGURE 8 is a side cross sectional view of the thrust bearing shown in FIGURES 1 to 4 in combination with the hub of a vehicle clutch throw-out bearing.

Description of the preferred embodiments

Figure 6:
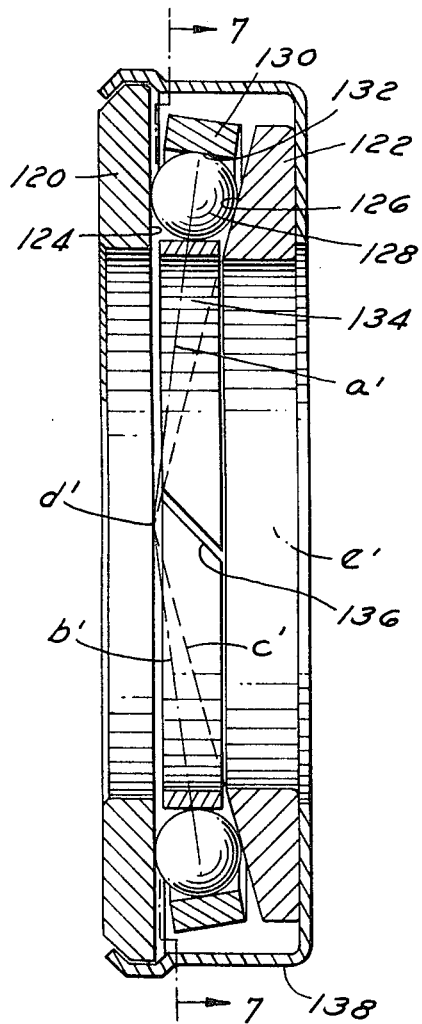
FIGURE 6 is a side cross sectional view of another embodiment of the thrust bearing of my invention, in the direction of view arrows 6—6 of FIGURE 7.

FIGURES 1 to 5, and 8 illustrate one embodiment of the thrust bearing of my invention, which may be utilized as a vehicle clutch throw-out bearing. An automotive clutch is composed of three distinct elements; two of which are driving elements, and one which is driven. The driving elements include the flywheel and the pressure plate, which is bolted to the flywheel. Positioned between the flywheel and the pressure plate is the driven disc, which is splined to the transmission input shaft. When the clutch is engaged, and the engine is running, the pressure plate springs compress the driven plate against the flywheel, causing the entire mechanism to revolve as a unit. When the clutch pedal is depressed, the clutch linkage compresses the pressure plate springs, relieving pressure on the driven disc, which allows it to turn freely. The clutch linkage actuates the throw-out bearing, which contacts the fingers of the pressure plate to compress the springs and release the driving pressure. In this position, no power is transmitted through the clutch, and the transmission gears can be shifted without difficulty. The throw-out bearing must therefore be capable of rotating at relatively high speeds with a minimum of wear.

Another problem results when the driver depresses the clutch only slightly, but enough to cause continuous rotation of the bearing, which is termed "riding" the clutch. When the bearing rotates at engine speed, the bearing is overheated, and is eventually destroyed. The thrust bearing of my invention is adapted to rotate with a minimum of frictional wear; thereby reducing overheating. This is accomplished by allowing the ball bearings of the clutch throw-out bearing to rotate freely, in their "natural orbit," rather than the sliding rotation of conventional bearings.

The embodiment of the thrust bearing shown in FIGURES 1 to 5 and 8 includes a pair of bearing members 20 and 22, defining opposed annular bearing faces 24 and 26, respectively. A plurality of roller members or ball bearings 28 are disposed between the bearing faces in roller bearing engagement therewith. A control ring 30 encircles the ball bearings having a bearing face 32 perpendicular to the rolling axis $a$ of the ball bearings. And a retainer or "expanding" ring 34 engages the inner surface of the ball bearings, and biases the balls against the control ring to establish a three point bearing contact between the ball bearings and the bearing faces 24, 26 and 32. The assembly is secured together by an annular dust cover 38, which is spun over at 40 and 42 against the bearing members. The retainer ring is split at 36, as shown in FIGURE 5, and expands against the inner surface of the balls. The split is preferably defined at an acute angle to the axis, as shown, to prevent locking of a ball against the split.

The bearing faces 24 and 26 of this embodiment each define a frustoconical surface whose projection, $b$ and $c$ respectively, converges at a point $d$ in the common axis $e$ of the annular bearing faces, and the rolling axis $a$ of the ball bearings 28.

In a clutch assembly, not shown, the throw-out bearing is pressed into a collar 44, shown in FIGURE 8, which is received on the transmission pinion, also not shown. The clutch linkage exerts a force $f$ on one of the bearing members 20, spacing the bearing member from the flange 42 of the cover, as shown at 46, thereby permitting the bearing member 20 to turn freely on the ball bearings. The balls in this embodiment will thus rotate in their "natural orbit," about the apex $d$, and the expansion ring 34 will compensate for irregularities of the balls. If the balls were restrained by a ball race, as shown by the prior art, the balls would not be able to rotate in the natural orbit, but would be restrained in the orbit defined by the race, and would still be subject to skidding and frictional wear. In the embodiment of the thrust bearing shown in FIGURES 1 to 5, the ball bearings 28 are spaced by smaller balls 48, as shown in FIGURE 4, which space the ball bearings 28 and rotate in a direction opposite to the rotation of the ball bearings.

Figure 7:
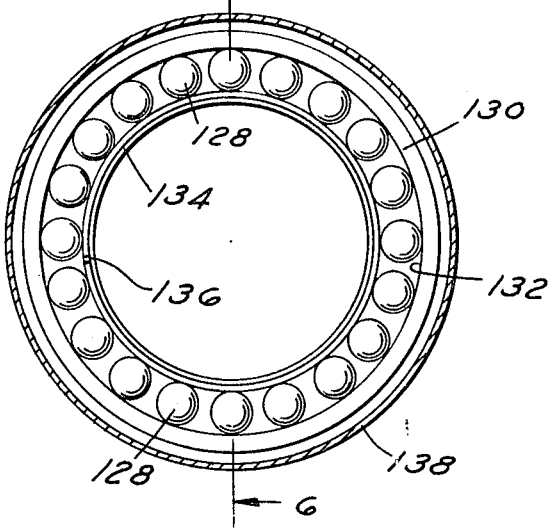
FIGURE 7 is a top cross sectional view of the thrust bearing shown in FIGURE 6, in the direction of view arrows 7—7.

In the embodiment of my invention shown in FIGURES 6 and 7, one of the bearing faces 124 is planar, and the other bearing face 126 is defined at twice the angle of the frustoconical bearing faces shown in the embodiment of FIGURES 1 to 5; such that the projections of the bearing faces converge at a point $d^1$, in the rolling axis $a^1$ of the ball bearings, as described above. In this embodiment, the thrust bearing includes a first bearing member 120 having a planar bearing face 124, a second bearing member 122 having a frustoconical bearing face 126, a plurality of balls 128 disposed between the bearing faces, a control ring 130 encircling the ball bearings having a bearing face 132 perpendicular to the rolling axis $a^1$ of the ball bearings, and an expansion or retaining ring 134 which urges the balls 128 against the control ring bearing face 132. The projection $c^1$ of the frustoconical bearing face 126 converges at twice the angle of the frustoconical bearing faces 24 and 26 of the embodiment shown in FIGURES 1 to 5, such that the balls will rotate in their "natural orbit" described above. It should also be noted that the bearing face 132 of the control ring is defined at an acute angle to the common axis $e^1$ of the bearing faces, and is perpendicular to the rolling axis $a^1$ of the balls, to define the same relationship to the balls as the control ring bearing face 32 in FIGURES 1 to 5. The dust cover 138 in this embodiment is disposed at the outer edge of the bearing, rather than the inner edge as shown in FIGURES 1 to 5, however the function and operation of the cover and the bearing elements is the same as described above, and have been numbered accordingly.

It will be understood by those skilled in the art that various modifications may be made to the thrust bearing of my invention. For example, spacer balls may be utilized in the thrust bearing assembly shown in FIGURES 6 and 7, and other means may be utilized to urge the balls against the control ring in either embodiment. The disclosed thrust bearings have been designed to be interchangeable with the commercial automotive clutch throw-out bearings, and the disclosed bearings may therefore be modified as required by the particular application. The materials utilized in the thrust bearing of my invention may conform to specification for conventional automotive thrust bearings, however, other materials may be utilized for special applications.

What is claimed is:

1. A thrust bearing, comprising: a pair of opposed bearing members defining opposed annular bearing faces, a plurality of roller members disposed between said bearing faces in roller bearing engagement therewith, a control ring encircling said roller members having a bearing face substantially perpendicular to the rolling axis of said roller members, and a retainer means urging said roller members toward said control ring and establishing a three point contact between said roller members and said bearing faces, the projection of said opposed annular bearing faces of the bearing members converging in a point in the common axis of said annular bearing faces and the rolling axis of said roller members to prevent abrasive sliding contact of said roller members against said bearing faces.

2. The thrust bearing defined in claim 1, characterized in that said opposed annular bearing faces each define a truncated conical bearing surface whose projections converge at said point.

3. The thrust bearing defined in claim 1, characterized in that one of said annular bearing faces defines a truncated conical bearing surface and the other bearing face is planar, and said bearing face of the control ring is defined at an acute angle to said planar surface, perpendicular to the rolling axis of said roller members.

4. The thrust bearing defined in claim 1, characterized in that said retainer means is a split ring bearing against the inner surfaces of said roller members.

5. The thrust bearing defined in claim 1, characterized in that said thrust bearing includes an annular dust cover which clamps the bearing members in the aforesaid position.

6. A thrust bearing, comprising: a pair of opposed bearing members defining converging opposed annular conical bearing faces, a plurality of ball bearings disposed between said bearing faces in rolling bearing engagement therewith, a control ring encircling said ball bearings having a bearing face substantially perpendicular to the rolling axis of said ball bearings, and a retainer means urging said ball bearing toward said control ring to establish a three point contact between said ball bearings and said bearing faces, the projection of said conical bearing faces converging to a point in the common axis of said conical bearing faces and the rolling axis of said ball bearings to prevent abrasive sliding contact of said ball bearings against said bearing faces.

7. The thrust bearing defined in claim 6, characterized in that said retainer means is a split ring bearing against the inner surfaces of said ball bearings.

8. The thrust bearing defined in claim 6, characterized in that said thrust bearing includes a plurality of roller spacer elements of a diameter less than the diameter of said ball bearings, said spacer elements located between said ball bearings.

9. A vehicle clutch throw-out bearing, comprising: a pair of bearing members defining opposed annular bearing faces, a plurality of free ball bearings disposed between said bearing faces, a control ring encircling said ball bearings having a bearing face perpendicular to the rolling axis of the said ball bearings, and a split retainer ring bearing against the inner surface of said ball bearings, establishing a three point bearing contact between said ball bearings and said bearing faces, the projection of said annular bearing faces converging to a point in the rolling axis of said ball bearings to prevent abrasive sliding contact of said ball bearings against said bearing faces.

10. The clutch throw-out bearing defined in claim 9, characterized in that said annular bearing faces are conical and the bearing face of said contact ring is parallel to their common axis.

11. The clutch throw-out bearing defined in claim 10, characterized in that said bearing members are identical and interchangeable.

12. The clutch throw-out bearing defined in claim 9, characterized in that one of said annular bearing faces defines a truncated conical surface and the other bearing face is planar, and said bearing face of the control ring is defined at an acute angle to said planar surface perpendicular to the rolling axis of said ball bearings.

References Cited

FOREIGN PATENTS 53,006   6/1917   Sweden.

MARTIN P. SCHWADRON, Primary Examiner

F. SUSKO, Assistant Examiner